(12) United States Patent
McCormick et al.

(10) Patent No.: US 9,162,866 B2
(45) Date of Patent: Oct. 20, 2015

(54) DUAL PUMP FLUID PROPORTIONER WITH ADJUSTABLE MOTOR POSITION

(75) Inventors: Martin P. McCormick, Forest Lake, MN (US); Ryan F. Butler, Brooklyn Park, MN (US); Kenneth C. Floer, Brooklyn Park, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 538 days.

(21) Appl. No.: 13/701,111

(22) PCT Filed: Jun. 24, 2011

(86) PCT No.: PCT/US2011/001131
§ 371 (c)(1),
(2), (4) Date: Nov. 30, 2012

(87) PCT Pub. No.: WO2012/074540
PCT Pub. Date: Jun. 7, 2012

(65) Prior Publication Data
US 2013/0064696 A1 Mar. 14, 2013

Related U.S. Application Data

(60) Provisional application No. 61/358,327, filed on Jun. 24, 2010.

(51) Int. Cl.
*F04B 53/22* (2006.01)
*B67D 99/00* (2010.01)
(Continued)

(52) U.S. Cl.
CPC .......... *B67D 99/00* (2013.01); *B01F 15/00662* (2013.01); *B05B 11/3084* (2013.01); *B05B 12/1418* (2013.01); *F04B 23/06* (2013.01); *F04B 53/22* (2013.01)

(58) Field of Classification Search
CPC .......... F04B 23/04; F04B 23/06; F04B 53/22; F04B 53/147; F04B 39/14; F04B 39/072; F04B 39/127; B05B 11/3081; B05B 11/3083; B05B 11/3084; B05B 12/1418; B01F 15/00662; B01F 15/0462; F04C 2230/604; F04D 29/60; B67D 99/00
USPC .......... 417/359, 360, 361, 423.6, 423.9, 417/423.14, 423.15, 424.1; 310/89, 91; 366/331
See application file for complete search history.

(56) References Cited

U.S. PATENT DOCUMENTS 2,925,780 A * 2/1960 Tear .............................. 417/399
3,196,802 A * 7/1965 Matheny ...................... 417/419
(Continued)

FOREIGN PATENT DOCUMENTS

EP 0 865 829 A2 9/1998
JP 05-044677 A 2/1993
(Continued)

OTHER PUBLICATIONS

International Search Report and Written Opinion of International Application Serial No. PCT/US2011/001131, dated Dec. 10, 2012, 9 pages.
(Continued)

*Primary Examiner* — Charles Freay
*Assistant Examiner* — Nathan Zollinger
(74) *Attorney, Agent, or Firm* — Kinney & Lange, P.A.

(57) ABSTRACT

A dual pump fluid proportioner having an adjustable motor position comprises a mounting plate, first and second positive displacement pumps, first and second tie rods, a pump yoke and a motor. The first and second tie rods fixedly connect the first and second pumps to the mounting plate. The first and second pumps each have a pump shaft. The pump yoke slidably couples to the first and second tie rods and the pump shafts. The motor adjustably couples to the mounting plate and includes a drive shaft. The drive shaft extends from the motor, through the mounting plate to adjustably couple to the yoke.

26 Claims, 5 Drawing Sheets

(51) Int. Cl.
   *B01F 15/00* (2006.01)
   *B05B 11/00* (2006.01)
   *B05B 12/14* (2006.01)
   *F04B 23/06* (2006.01)

(56) References Cited

U.S. PATENT DOCUMENTS

| | | | | |
|---|---|---|---|---|
| 3,207,378 | A | * | 9/1965 | Trumbull et al. ............. 222/134 |
| 4,080,874 | A | * | 3/1978 | Burkhard ........................ 92/13.7 |
| 4,132,483 | A | * | 1/1979 | Slaats et al. ................. 366/162.3 |
| 4,693,397 | A | * | 9/1987 | Lang ............................... 222/137 |
| 4,878,601 | A | | 11/1989 | Flemming et al. |
| 5,158,438 | A | * | 10/1992 | Olson et al. ................... 417/360 |
| 5,305,917 | A | * | 4/1994 | Miller et al. ..................... 222/63 |
| 5,524,983 | A | * | 6/1996 | Dittgen et al. .............. 366/160.4 |
| 6,131,770 | A | | 10/2000 | Allen |
| 6,168,308 | B1 | * | 1/2001 | Pittman et al. ............. 366/162.3 |
| 6,315,442 | B1 | * | 11/2001 | Jerkel ......................... 366/160.4 |
| 7,452,193 | B1 | * | 11/2008 | Wright .......................... 417/429 |

FOREIGN PATENT DOCUMENTS

| | | |
|---|---|---|
| JP | 10-122159 A | 5/1998 |
| JP | 3122019 | 6/2006 |
| JP | 03127657 | 12/2006 |
| WO | 2004042484 A2 | 5/2004 |

OTHER PUBLICATIONS

European Patent Office, European Search Report, Jan. 15, 2015, 4 pages.

* cited by examiner

DUAL PUMP FLUID PROPORTIONER WITH ADJUSTABLE MOTOR POSITION

BACKGROUND

The present invention relates generally to plural-component spray systems. In particular, the present invention relates to reciprocating fluid proportioners having at least two pumps.

Fluid proportioners comprise dispensing systems that receive separate inert fluid components, mix the components in a predetermined ratio and then dispense the components as an activated compound. For example, fluid proportioners are used to dispense epoxies and polyurethanes that solidify after mixing of a resin component and an activating material, which are individually inert. However, after mixing an immediate chemical reaction begins taking place that results in the cross-linking, curing, and solidification of the mixture. Therefore, the two components are routed separately into the proportioner so that they can remain segregated as long as possible. A manifold receives each component after it is pumped separately and mixes the components so the mixture can be dispensed from a sprayer coupled to the manifold.

A typical fluid proportioner comprises a pair of positive displacement pumps that individually draw in fluid from separate fluid hoppers and pump pressurized fluids to the mix manifold. The pumps are driven in synchronicity by a common motor, typically an air motor or hydraulic motor, having a reciprocating drive shaft. Such configurations are simple and easy to design when the fluid components are dispensed in a 1:1 ratio and the pumps are of equal volumetric displacement. Force balancing in these configurations can be adequately accommodated by placing the motor halfway between the pumps. As such, forces generated between the pumps and the motor are equal.

Most two component epoxies and polyurethanes are not, however, comprised of a 1:1 ratio of the components. Typically a first major component is needed in a higher concentration than a second minor component. In such a case, displacement of one pump is required to be larger than the other. However, such systems can not be designed by simply placing the motor halfway between the pumps. Forces needed to drive each pump are different such that center mounting of the motor results in side loading that produces undesirable binding, wear and leakage.

Conventional fluid proportioners have used three pumps to deliver two components. For example, two pumps of equal displacement are used. Each will dispense half of the required volume of the major component. The motor is positioned halfway between these pumps. A third pump is used to dispense the minor component at the requisite volume. The third pump is placed in-line with the air motor. Thus, forces from the three pumps are balanced on all sides of the air motor.

Needless to say, conventional dual component fluid proportioners require the use of additional components, thereby increasing the weight, size and cost of the system. An additional pump, pressure gauge, manifold and hoses are needed to integrate the third pump with the two component system. For example, a splitter manifold is needed to separate fluid from the fluid source to the inlets of the two pumps providing the same fluid. Additionally, a mix manifold is needed to integrate fluid from the outlets of the two pumps providing the same fluid. The additional components increase the complexity of the system, reducing ease of operation. Furthermore, due to the increasing viscosities of compounds being developed, it has been necessary to increase the size of the motor used to pump the fluid components. This makes the driving of additional pumps even less desirable. There is therefore a need for improved multi-component proportioner systems.

SUMMARY

The present invention is directed to a dual pump fluid proportioner having an adjustable motor position. The proportioner comprises a mounting plate, first and second positive displacement pumps, first and second tie rods, a pump yoke and a motor. The first and second tie rods fixedly connect the first and second pumps to the mounting plate. The first and second pumps each have a pump shaft. The pump yoke slidably couples to the first and second tie rods and the pump shafts. The motor adjustably couples to the mounting plate and includes a drive shaft. The drive shaft extends from the motor, through the mounting plate to adjustably couple to the yoke.

DETAILED DESCRIPTION

Figure 1:
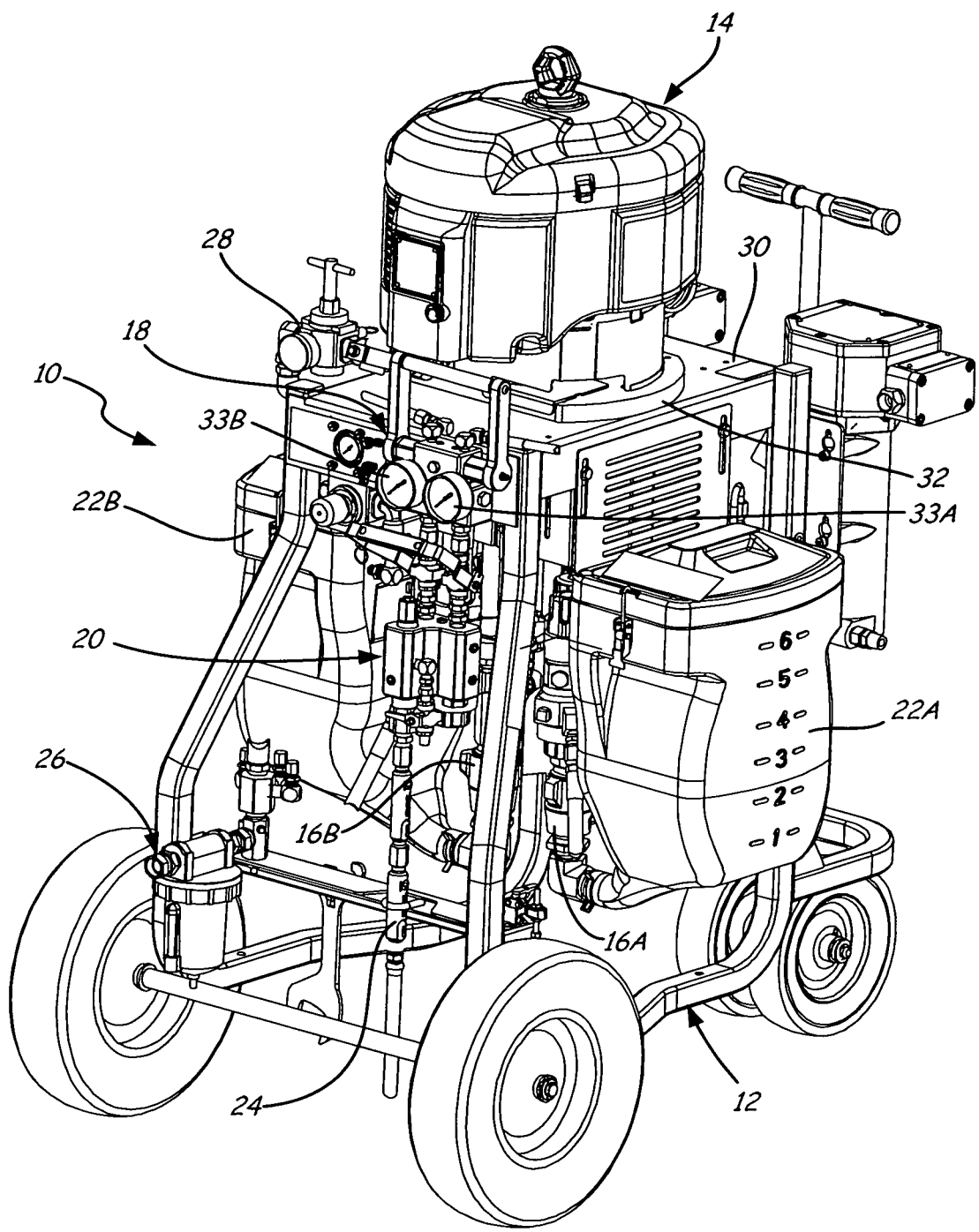
FIG. 1 is a perspective view of a dual pump proportioner system having an adjustable position air motor.

FIG. 1 is a perspective view of dual pump proportioner system 10 of the present invention. Proportioner system 10 is mounted on cart 12 and includes air motor 14, fluid pumps 16A and 16B, fluid manifold 18, mix manifold 20 and fluid hoppers 22A and 22B. Air motor 14 drives pumps 16A and 16B such that fluid from hoppers 22A and 22B is mixed in mix manifold 20 before being dispensed by a spray gun (not shown) coupled to static mix tube outlet 24. High pressure air is provided to system 10 at air inlet 26. A hose (not shown) connects air inlet 26 to main air control 28, which includes a switch or valve for feeding pressurized air to air motor 14. Air motor 14 is mounted to platform 30 of cart 12 using mounting plate 32. Air motor 14 comprises any conventional air motor as is known in the art. In other embodiments, a hydraulic motor is used. However, any motor having a reciprocating shaft may be used. As is discussed in detail with reference to FIGS. 2 and 3, pumps 16A and 16B are supported underneath air motor 14 such that air motor 14 can actuate pumps 16A and 16B. Operation of air motor 14 causes fluid within hoppers 22A and 22B to be drawn into pumps 16A and 16B, respectively, and pushed out to fluid manifold 18. Pumps 16A and 16B comprise conventional positive displacement pumps having reciprocating pump shafts, as are known in the art. Fluid manifold 18 controls flow of fluid to mix manifold 20, keeping the fluid components separated until after pumping. Mix manifold 20 marries the fluids on their way to static mix tube outlet 24. As such, the fluids are not actually mixed until entering static mix tube outlet 24. Fluid manifold 18 includes pressure gauges 33A and 33B, which provide an indication of the fluid pressures generated by pumps 16A and 16B, respectively. As discussed in detail with reference to FIGS. 3 and 4, the position of air motor 14 on plate 32 can be adjusted relative to pumps 16A and 16B to balance the forces of pumps 16A and 16B with respect to air motor 14.

Figure 2:
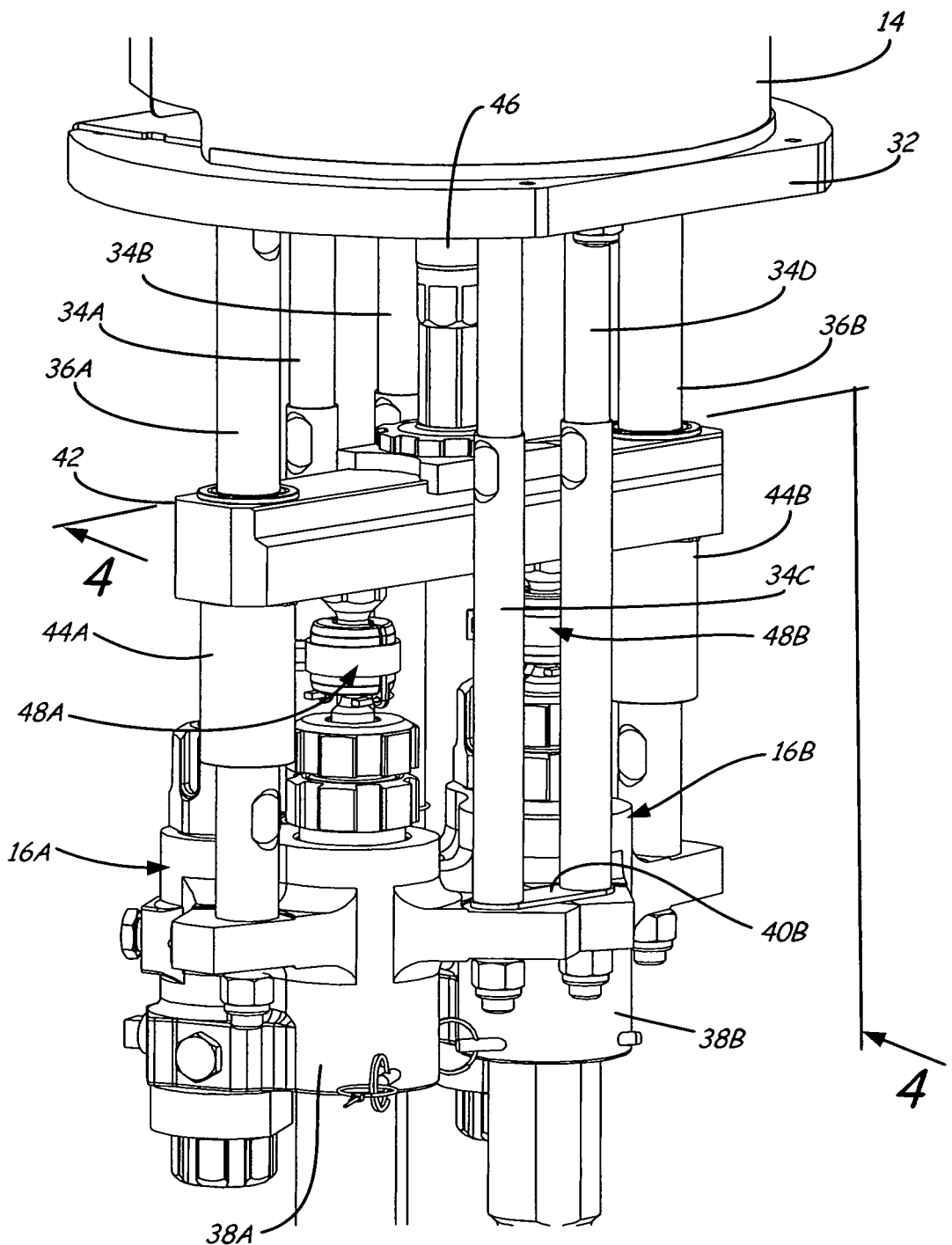
FIG. 2 is a close-up perspective view of a back side of the dual pump proportioner system of FIG. 1 showing tie rods coupling an air motor to a pair of pumps.
Figure 3:
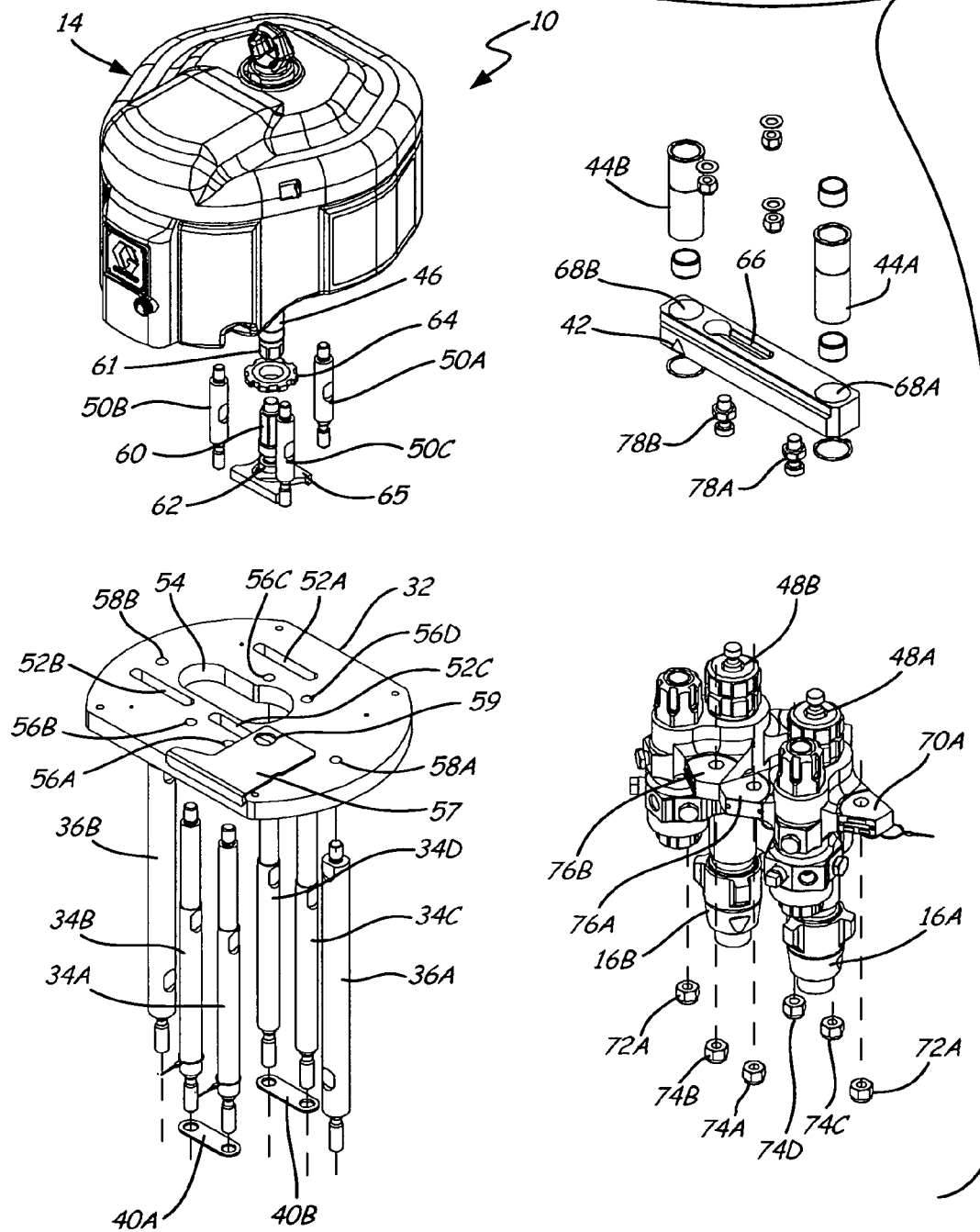
FIG. 3 is an exploded perspective view of the dual pump proportioner system of FIGS. 1 and 2 showing coupling of the air motor and pumps to a mounting plate.
Figure 4:
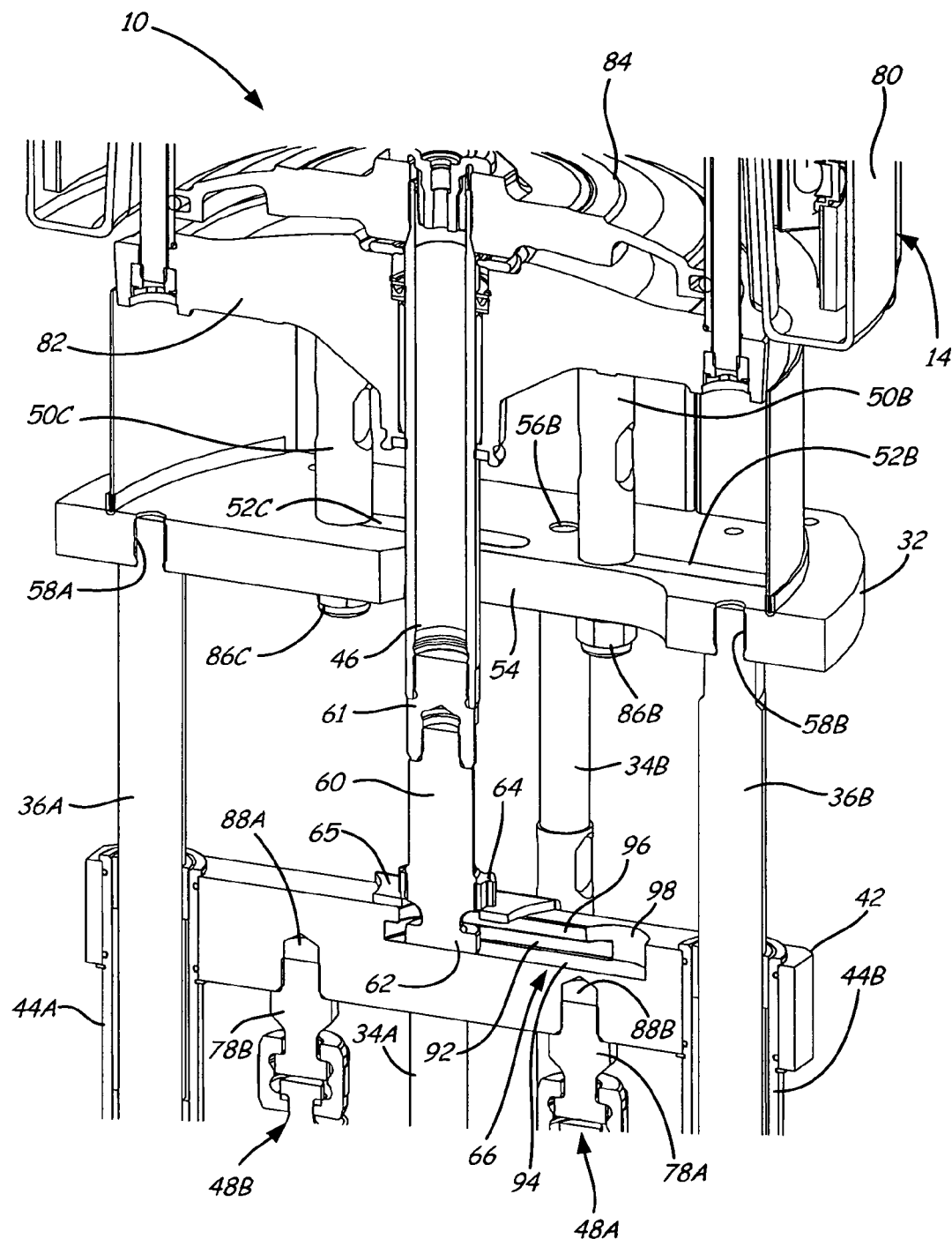
FIG. 4 is a cross-sectional view through the dual pump proportioner system as taken at section 4-4 of FIG. 2.

FIG. 2 is a close-up perspective view of a back side of dual pump proportioner system 10 of FIG. 1 showing support tie rods 34A-34D and pump tie rods 36A and 36B coupling air motor 14 to pumps 16A and 16B. FIG. 2 shows the rear side of air motor 14 and pumps 16A and 16B with respect to the front of system 10 shown in FIG. 1. Air motor 14 is coupled to mounting plate 32, as shown in FIG. 4. Tie rods 34A-34D are coupled to plate 30 at their uppermost ends and coupled to pump housings 38A and 38B at their lowermost ends. Specifically, tie rods 34A, 34C and 36A connect pump housing 38A of pump 16A to mounting plate 32, and tie rods 34B, 34D and 36B connect pump housing 38B of pump 16B to mounting plate 32. Housings 38A and 38B are coupled together with link 40A (shown in FIG. 3), which connects to tie rods 34A and 34B. Another link 40B (FIGS. 2 and 3) is coupled to tie rods 34C and 34D. Links 40A and 40B connect adjacent tie rods that are joined to different pump housings. The uppermost ends of tie rods 36A and 36B are coupled to mounting plate 32 and the lowermost ends are coupled to pump housings 38A and 38B, respectively. Tie rods 36A and 36B extend through yoke 42. Bushings 44A and 44B surround tie rods 36A and 36B, respectively, within yoke 42. Drive shaft 46 extends from air motor 14, through mounting plate 32, and couples to yoke 42. Yoke 42 also couples with pump shafts 48A and 48B of pumps 16A and 16B, respectively.

Drive shaft 46 reciprocates yoke 42, which glides along tie rods 36A and 36B with the aid of bushings 44A and 44B, respectively. Yoke 42 reciprocates pump shafts 48A and 48B, which cause pumps 16A and 16B to draw fluid from hoppers 22A and 22B and to push fluid into fluid manifold 18, as discussed with reference to FIG. 1. Tie rods 34A-34D and tie rods 36A and 36B maintain pump housings 38A and 38B stationary with respect to air motor 14 and plate 32. Yoke 42 and piston shafts 48A and 48B reciprocate between mounting plate 32 and pump housings 38A and 38B under power from drive shaft 46. Mounting plate 32 permits air motor 14 to be displaced laterally with respect to tie rods 34A-34D and tie rods 36A and 36B, such that pump shaft 46 can be shifted with respect to pump shafts 48A and 48B. As shown in FIG. 3, mounting plate 32 includes slots to permit air motor 14 to shift, and yoke 42 includes a slot to permit motor shaft 46 to shift and bores to permit yoke 42 to slide along pump shafts 48A and 48B.

FIG. 3 is an exploded perspective view of dual pump proportioner system 10 of FIGS. 1 and 2. System 10 includes air motor 14 and pumps 16A and 16B. Air motor 14 is coupled to mounting plate 32 using motor tie rods 50A-50C, and pumps 16A and 16B are coupled to mounting plate 32 using support tie rods 34A-34D and pump tie rods 36A and 36B. Mounting plate 32 includes slots 52A-52C, motor opening 54, bores 56A-56D and bores 58A and 58B. Slide 57 is positioned between motor 14 and mounting plate 32. When assembled, motor tie rods 50A-50C extend into slots 52A-502C. As shown, slide 57 includes a hole for receiving tie rod 50C before insertion into slot 52C. Tie rods 34A-34D are fastened to bores 56A-56D, respectively. When assembled, pump tie rods 36A and 36B are fastened to bores 58A and 58B, respectively, at their upper ends, and coupled with yoke 42 at their lower ends. Motor shaft 46 extends into shaft bore 54. Motor shaft 46 includes extension 60 and coupler 61. Extension 60 includes head 62 for coupling with yoke 42. Extension 60 includes nut 64 and gauge 65 is fitted around extension 60 to ride along mounting plate 32. When assembled, nut 64 is tightened down on gauge 65 to immobilize extension 60 (and drive shaft 46) with respect to yoke 42. Tie rods 36A and 36D extend from bores 58A and 58B down to yoke 42 when assembled. Yoke 42 includes shaft slot 66 and tie rod bores 68A and 68B. Tie rods 36A and 36D pass through bushings 44A and 44B and bores 68A and 68B, respectively. Pump tie rods 36A and 36B couple to pump housings 38A and 38B, respectively. For example, tie rod 36A is secured to flange 70A using nut 72A. Tie rod 36B is similarly secured to a flange (not shown) using nut 72B. Likewise, support tie rods 34A-34D extend down from mounting plate 32 to flanges located on pump housings 38A and 38B and are secured with nuts 74A-74D. For example, tie rods 34A and 34B couple to flanges 76A and 76B using nuts 74A and 74B, respectively. Adapters 78A and 78B of pump shafts 48A and 48B are joined to couplers on the underside of yoke 42, as is shown in FIG. 4.

FIG. 4 is a cross-sectional view through dual pump proportioner system 10 as taken at section 4-4 of FIG. 2. Proportioner system 10 includes air motor 14, mounting plate 32 and yoke 42. Air motor 14 includes housing 80, base 82, piston 84, drive shaft 46, coupler 61 and extension 60. Mounting plate 32 includes motor slots 52A (FIG. 3), 52B and 52C, drive shaft bore 54, mounting bores 56A-56D (only 56B shown) and mounting bores 58A and 58B. Motor tie rods 50A (FIG. 3), 50B and 50C join motor base 82 to mounting plate 32 with motor nuts 86A, 86B and 86C (FIG. 3). Support tie rods 34A and 34B and pump tie rods 36A and 36B join mounting plate 32 to pumps 16A and 16B (FIG. 3). Yoke 42 links tie rods 36A and 36B with head 62 of extension 60, which is coupled to drive shaft 46 through coupler 61. Yoke 42 includes coupling sockets 88A and 88B for joining with adapters 78A and 78B, respectively, of pump shafts 48A and 48B. Coupling sockets 88A and 88B comprise bores penetrating into the underside of yoke 42, which are threaded to receive adapters 78A and 78B. Shaft slot 66 comprises elongate channel 92, base 94, flange 96 and entry bore 98. Shaft slot 66 and sockets 88A and 88B are be milled into yoke 42 using any conventional machining technique. Reciprocation of drive shaft 46 is achieved by alternating the introduction of pressurized air into alternating sides of piston 84 within housing 80, thus causing yoke 42 to ride on pump tie rods 36A and 36B and pump shafts 48A and 48B to be actuated.

As shown in FIG. 4, shaft bore 54 comprises a large elongate hole in mounting plate 32 that sits directly above shaft slot 66 in yoke 42, which comprises an elongate opening in yoke 42. Shaft bore 54 is oriented generally to extend between bores 58A and 58B that receive tie rods 36A and 36B, respectively. Tie rods 36A and 36B extend parallel in a plane that is coplanar with a plane including both of pump shafts 48A and 48B. As such, shaft bore 54 extends along a lateral axis extending through the centers of pumps 16A and 16B. Similarly, shaft slot 66 is oriented generally to extend between bores 68A and 68B of yoke 42. As such, shaft slot 66 extends along a lateral axis extending through the centers of pumps 16A and 16B. Shaft bore 54 is thus parallel with shaft slot 66. Slots 52A-52C for motor tie rods 50A-50C also comprise elongate holes in mounting plate 32 oriented along mounting plate 32 parallel to the orientation of shaft bore 54 and shaft slot 66.

Motor tie rods 50A-50C include necked down ends (see FIG. 3) that ride within slots 52A-52C, respectively. Nuts 86A-86C are threaded onto the necked down ends to engage mounting plate 32. Head 62 of extension 60 is inserted into shaft slot 66. Specifically, head 62 is inserted into elongate channel 92 through entry bore 98, which is located at an end of channel 92, and then slid to the middle of channel 92. Head 62 rides within channel 92 above base 94. Flange 96 extends over the top of head 62 such that extension 60 is prevented from retracting from shaft slot 66. Nut 64 is threaded onto extension 60 to engage yoke 42. Thus, when drive shaft 46 is reciprocated by motor 14, head 62 is capable of pushing and pulling yoke 42 along with the reciprocating motion.

Bushings 44A and 44B assists in yoke 42 sliding along tie rods 36A and 36B. Bushings 44A and 44B are tightly fitted into bores 68A and 68B of yoke 42 such that tie rods 36A and 36B slide within bushings 44A and 44B. As such, bushings 44A and 44B are comprised of or lined with any suitable material to facilitate low-friction sliding. In one embodiment, bushings 44A and 44B comprise dry linear bearings made of composite materials. Bushings 44A and 44B are also configured to prevent uneven loading of motor 14 by pumps 16A and 16B. In particular, if one of pumps 16A and 16B runs out of fluid or becomes restricted, such as from hoppers 22A or 22B, the load produced by that pump will be significantly reduced, reducing the resistance to motor 14 and yoke 42. Bushings 44A and 44B prevent yoke 42 from becoming cocked on tie rods 36A and 36B. In other words, bushings 44A and 44B prevent one of bores 68A and 68B from becoming higher than the other on tie rods 36A and 36B. Bushings 44A and 44B are taller than yoke 42 to prevent rotation or cocking of yoke 42. In the depicted embodiment, bushings 44A and 44B are over twice as tall as yoke 42. As such, the ability of yoke 42 to rotate with respect to tie rods 36A and 36B is greatly inhibited. Damage and wear to pumps 16A and 16B is thus prevented. During normal, balanced operation of system 10, bearings 44A and 44B have little or no influence on movement of yoke 42.

When pump 16A and pump 16B are of equal volumetric displacement, such that proportioner dispenses in a 1:1 ratio, motor 14 is positioned centrally between pumps 16A and 16B. Forces generated between pumps 16A and 16B and motor 14 will be equal such that yoke 42 will slide smoothly along tie rods 36A and 36B. In particular, the moment created about head 62 by each of piston shafts 48A and 48B will be equal because the moment arm for piston shaft 48A (the distance between head 62 and coupling socket 88A) will be equal to the moment arm for piston shaft 48B (the distance between head 62 and coupling socket 88B). However, it is often desirable to dispense from proportioner system 10 an end product made up of constituent components that are not distributed equally. Frequently, the constituent components are mixed in ratios up to about 4:1.

When one of pumps 16A and 16B has a greater volumetric displacement than the other, the present invention permits motor 14 to be shifted along mounting plate 32 to offset the greater forces generated by the larger pump, without affecting the position of pumps 16A and 16B. The position of air motor 14 relative to mounting plate 32 is adjusted by loosening nuts 86A-86C. As such, motor tie rods 50A-50C are free to slide in slots 52A-52C. Additionally, nut 64 on extension 60 is loosened such that head 62 is free to slide in channel 92. Because shaft bore 54 is directly above shaft slot 66, mounting plate 32 does not interfere with movement of drive shaft 46. Motor 14 is shifted toward the pump having the larger displacement, the pump that generates the greater force, to decrease the moment arm generated by that force on head 62. After the position of motor 14 is shifted to accommodate the difference in pump displacement, the force generated by piston shaft 48B multiplied by the length between head 62 and coupling socket 88B is equal to the force generated by piston shaft 48A multiplied by the length between head 62 and coupling socket 88A.

Figure 5:
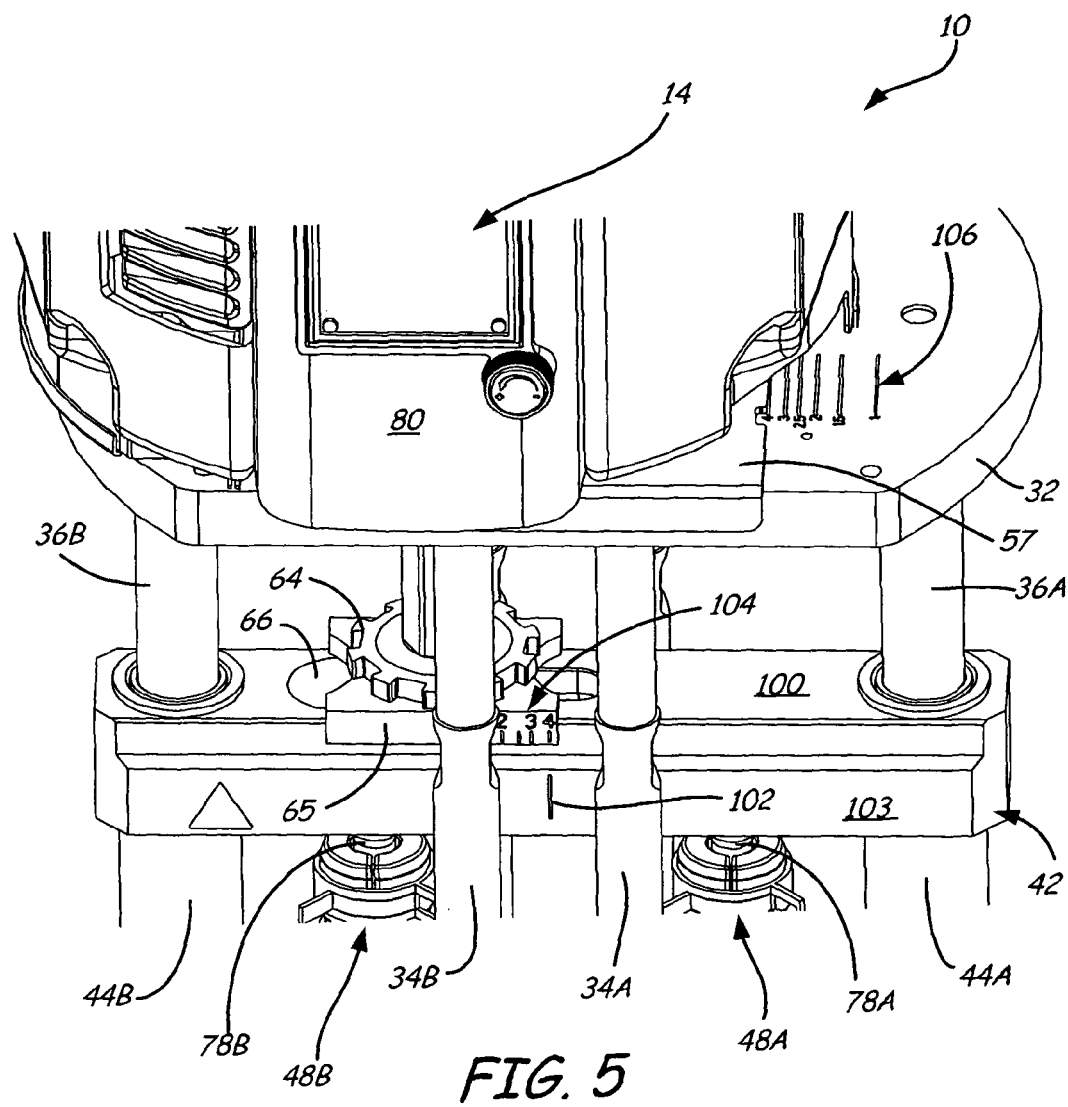
FIG. 5 is a close-up perspective view of a front side of the dual pump proportioner system of FIG. 1 showing markings used to measure the position of the air motor with respect to the pumps.

FIG. 5 is a close-up perspective view of a front side of dual pump proportioner system 10 of FIG. 1 showing markings used to measure the position of air motor 14 with respect to pumps 16A and 16B. Yoke 42 includes top surface 100 into which shaft slot 66 extends, and side surface 103 on which center mark 102 is engraved. Gauge 65 rests on top surface 100 and includes graduation marks 104. Slide 57 sits on top of mounting plate 32, which includes graduation marks 106.

Graduation marks 104 and 106 are derived using Equation 1 and predetermined values for the volumetric displacement of pumps 16A and 16B and the distance between pumps 16A and 16B as installed in proportioner system 12.

$$d = D/(V+1) - (1/2)D \qquad \text{[Equation 1]}$$

Distance d typically results in a negative number. Distance d is equal to the distance motor 14 is moved away from center mark 102. The absolute value of distance d is also equal to the distance motor 14 is moved toward the pump having the greater displacement volume starting from a position midway between. Distance D is equal to the distance between the centerline of pump shaft 48A of pump 16A and the centerline of pump shaft 48B of pump 16B. Volumetric ratio V is equal to the ratio of the displacement volume of the pump with the larger displacement to the displacement volume of the pump with the smaller displacement.

For example, if pump 16B has a volumetric ratio four times larger than that of pump 16A such that the volumetric ratio of proportioner system 10 is 4:1, volumetric ratio V is 4. If distance D is 30 cm, motor 14 is initially positioned such that motor 14 is 15 cm from each of pumps 16A and 16B. By evaluating Equation 1 with V=4 and D=30 cm, distance d becomes -9 cm. Motor 14 is moved 9 cm towards second pump 16B, which has the larger displacement. Thus, second pump 16B is positioned about 6 cm (15 cm-9 cm) from motor 14 and first pump 16A is positioned about 24 cm (15 cm+9 cm) from motor 14. As such, each pump produces the same amount of moment on head 62. Assuming that the ratio of force generated by the pumps is proportional to the volumetric displacement ratio of the pumps, second pump 16B produces 24 units of torque (4*6 cm) on head 62, as does first pump 16A (1*24 cm).

Graduation marks 104 and 106 are used to independently indicate how far to slide motor 14 without having to evaluate Equation 1. For example, with nuts 86A-86C and nut 64 loosened, motor 14 is slid until the edge of slide 57 that extends across graduation marks 106 lines up with the mark corresponding to a pump ratio of 4. Similarly, motor 14 is slid until the graduation mark corresponding to a pump ratio of 4 on gauge 65 aligns with center mark 102 on yoke 42. Graduation marks 104 and 106 are provided with marks that correspond to different pump ratios. If proportioner system is desired to be used in a 2:1 ratio, second pump 16B is swapped out for a pump having a volumetric displacement twice as large as that of first pump 16A. Motor 14 is slid back toward first pump 16A until center mark 102 aligns with the graduation mark corresponding to a pump ratio of 2 on gauge 65 and slide 57 aligns with the graduation mark corresponding to a pump ratio of 2 on mounting plate 32. In other words, if motor 14 were starting from the center position halfway between pumps 16A and 16B, motor 14 would be slid towards pump 16B a distance d that would align center mark 102 with the appropriate graduation mark on gauge 65 for a pump ratio of 2.

The present invention simplifies the design, construction and operation of proportioners for use with uneven pump ratios, thereby reducing cost. The proportioner system of the present invention only utilizes two pumps, and two pressure gauges as opposed to prior art systems that required three pumps and three pressure gauges to pump two fluids in an uneven ratio. By reducing the number of pumps to the same number of fluids that are being mixed, operation of the system is simplified and is more easily understood by operators. The use of extra gauges, pumps, manifolds and hoses are eliminated.

Although the present invention has been described with reference to preferred embodiments, workers skilled in the art will recognize that changes may be made in form and detail without departing from the spirit and scope of the invention.

The invention claimed is:

1. A dual pump fluid proportioner having an adjustable motor position, the proportioner comprising:
   a mounting plate;
   first and second positive displacement pumps each having a pump shaft;
   first and second tie rods fixedly connecting the first and second pumps to the mounting plate;
   a pump yoke slidably coupled to the first and second tie rods and fixedly coupled to the pump shafts at first and second points, respectively; and
   a motor coupled to the mounting plate, the motor including a drive shaft extending from the motor to couple to the yoke at a third point;
   wherein a position of the motor on the mounting plate is adjustable to change the position of the third point on the yoke with respect to the first and second points.

2. The dual pump proportioner of claim 1 wherein the third point is positioned between the first and second points and the third point is movable to change the moment generated at the third point by the first and second pumps.

3. The dual pump proportioner of claim 2 wherein volumetric displacement of the first pump is larger than volumetric displacement of the second pump and the third point is movable to a position where moment generated by the first pump and the second pump on at the third point is equal.

4. The dual pump proportioner of claim 2 wherein:
   the mounting plate includes an elongate shaft bore through which the drive shaft extends; and
   the yoke includes an elongate shaft slot to which the drive shaft couples.

5. The dual pump proportioner of claim 2 and further comprising:
   a set of motor slots extending thought the mounting plate, each slot extending parallel to the lateral axis; and
   a set of motor tie rods connecting the motor to the set of motor slots;
   a set of nuts threaded onto the motor tie rods to engage the mounting plate and immobilize the motor with respect to the mounting plate; and
   a shaft nut threaded onto the drive shaft to engage the yoke and immobilize the drive shaft with respect to the yoke.

6. The dual pump proportioner of claim 1 and further comprising:
   a mark on either the yoke or the mounting plate to indicate a position of the drive shaft or the motor, respectively, with respect to the first and second pumps.

7. A dual pump fluid proportioner having an adjustable motor position, the proportioner comprising:
   a mounting plate comprising:
   a main body;
   a shaft bore;
   mounting bores; and
   motor slots;
   a motor having a drive shaft;
   motor tie rods coupling the motor to the motor slots on a first side of the main body such that the drive shaft extends through the shaft bore;
   pump tie rods having first ends coupled to the mounting bores on a second side of the main body;
   a pump yoke comprising:
   slide bores through which the pump tie rods extend; and
   a shaft slot that receives an end of the drive shaft; and
   wherein the shaft slot, shaft bore and motor slots permit the position of the motor to be adjusted on the main body relative to the pump yoke.

8. The proportioner of claim 7 wherein the shaft slot comprises:
   an elongate channel having a base;
   a flange surrounding the channel and overhanging the base; and
   an entry bore cutting back the flange at an end of the elongate channel.

9. The proportioner of claim 8 wherein the shaft bore comprises:
   an elongate hole passing through the main body;
   wherein the elongate hole overlaps the elongate channel.

10. The proportioner of claim 9 wherein each of the motor slots comprises:
    an elongate opening passing through the main body;
    wherein the elongate openings are parallel to the elongate hole.

11. The proportioner of claim 7 and further comprising:
    bushings surrounding the pump tie rods within the slide bores;
    wherein a height of the bushings exceeds a height of the yoke.

12. The proportioner of claim 7 and further comprising:
    a yoke nut for tightening the drive shaft to the shaft slot of the yoke; and
    a plurality of tie rod nuts for tightening the motor tie rods to the motor slots of the mounting plate.

13. The proportioner of claim 7 and further comprising:
    first and second pumps each comprising:
    a pump housing coupled to one of the pump tie rods; and
    a pump shaft coupled to the yoke.

14. The proportioner of claim 13 wherein the yoke includes coupling sockets configured to receive adapters coupled to ends of the pump shafts.

15. The proportioner of claim 13 and further comprising:
    support tie rods extending from mounting bores in the mounting plate to the pump housings without passing through the yoke.

16. The proportioner of claim 15 and further comprising:
    clips coupling adjacent support tie rods coupled to different pump housings.

17. The proportioner of claim 13 wherein the shaft slot, shaft bore and motor slots permit the position of the motor to be laterally displaced with respect to the slide bores in the pump yoke while the position of the first and second pumps is fixed with respect to the slide bores.

18. The proportioner of claim 17 wherein the mounting plate further comprises:
    hash marks indicating position of the motor with respect to a center of the mounting plate.

19. The proportioner of claim 13 wherein the displacement of the first pump is greater than the displacement of the second pump and wherein the shaft slot, shaft bore and motor slots permit the motor to be shifted closer to first pump.

20. The proportioner of claim 7 and further comprising:
    a gauge disposed around the drive shaft adjacent the pump yoke;
    graduation marks disposed along an edge of the gauge; and
    a hash mark disposed on a side of the pump yoke delineating a center point of the pump yoke.

21. A method of adjusting a position of a motor in a dual pump fluid proportioner, the method comprising:
   loosening nuts securing a motor to slots on a mounting plate in the proportioner;
   loosening a nut securing a motor drive shaft to a slot on a pump yoke in the proportioner; and
   sliding the motor on the slots such that the drive shaft moves through a bore in the mounting plate and the drive shaft moves through the slot in the pump yoke.

22. The method of claim 21:
   wherein the proportioner includes a first pump having a first volumetric displacement and a second pump having a second volumetric displacement greater than the first;
   wherein a distance D is provided between the first pump and the second pump;
   wherein there is a ratio V of the first volumetric displacement to the second volumetric displacement;
   the method further comprising:
      adjusting the position of the motor a distance d closer to the second pump according to the following formula:
      $d = D/(V+1) - (1/2)D$.

23. The method of claim 22:
   tightening the nuts securing the motor to the mounting plate and the nut securing the drive shaft to the yoke such that the motor is a distance D+d from the drive shaft.

24. The method of claim 22 wherein:
   the drive shaft includes a gauge comprising graduation marks having values for a predetermined distance D and various ratios V;
   the method further comprising:
   aligning a graduation mark with a centerline on the yoke such that the motor is a distance D+d from the second pump.

25. The method of claim 22 wherein:
   the motor includes a slide; and
   the mounting plate includes a gauge comprising graduation marks having values for a predetermined distance D and various ratios V;
   the method further comprising:
   aligning an edge of the slide with a graduation mark such that the motor is a distance D+d from the second pump.

26. The method of claim 21:
   wherein the proportioner includes a first pump having a first volumetric displacement and a second pump having a second volumetric displacement greater than the first;
   the method further comprising:
   sliding the motor to a position where moment generated by the first pump and the drive shaft is approximately equal to moment generated by the second pump and the drive shaft.

* * * * *